United States Patent

Aweimrine

[15] 3,640,139
[45] Feb. 8, 1972

[54] MECHANICAL LOCK CYLINDER

[72] Inventor: Kamal Y. Aweimrine, 4209 West First St., Los Angeles, Calif. 90004

[22] Filed: June 1, 1970

[21] Appl. No.: 42,330

[52] U.S. Cl. ..........................................74/89.15
[51] Int. Cl. ..............................................F16h 27/02
[58] Field of Search ..............74/89.15, 424.8; 248/424, 430, 248/429; 5/66, 68

[56] References Cited

UNITED STATES PATENTS

| | | | |
|---|---|---|---|
| 3,436,973 | 4/1969 | Aweimrine | 74/89.15 |
| 3,278,952 | 10/1966 | Holm | 5/66 |
| 2,298,717 | 10/1942 | Nardone | 74/89.15 |
| 3,195,366 | 7/1965 | Smith | 74/424.8 |
| 3,479,890 | 11/1969 | Howell | 74/424.8 |

Primary Examiner—William F. O'Dea
Assistant Examiner—Wesley S. Ratliff, Jr.
Attorney—Robert C. Comstock

[57] ABSTRACT

A mechanical lock cylinder which is particularly adapted for use on aircraft or other vehicle seats, as well as for other uses. The device includes housing means enclosing an elongated screw type of shaft which is mounted in a rotatable ball nut. The shaft is normally held against rotation by a pair of locking means disposed at opposite ends of the housing. Upon release of either locking means, the screw may be freed for selective inward or outward linear movement. A manually adjustable stroke limiting device is provided to limit the stroke of the screw or to prevent its rotation altogether.

7 Claims, 9 Drawing Figures

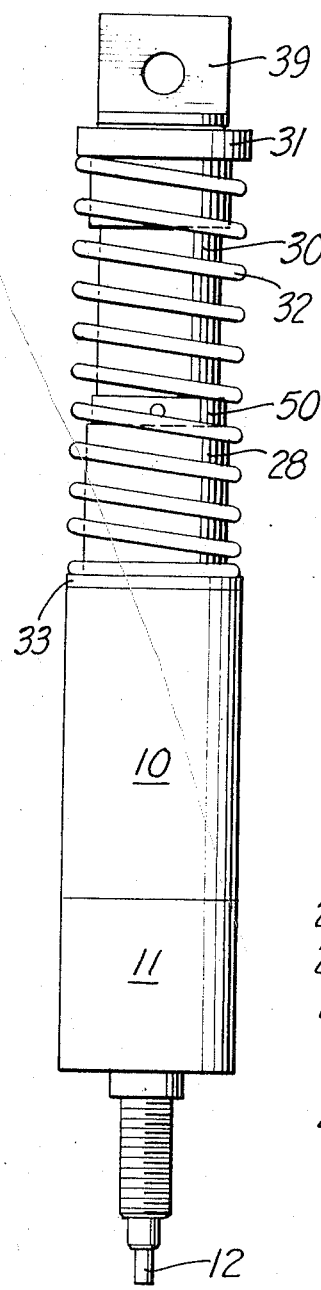
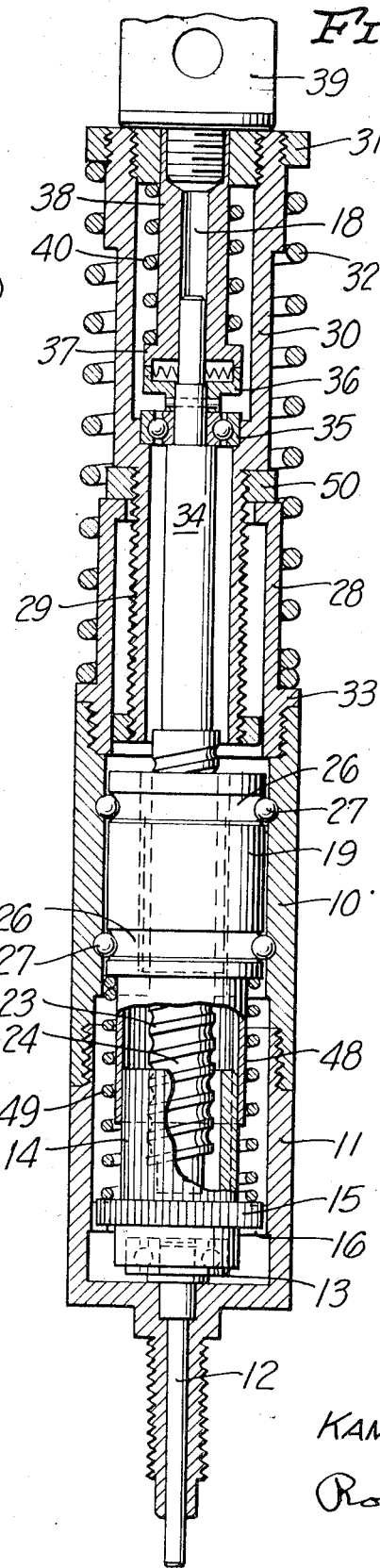
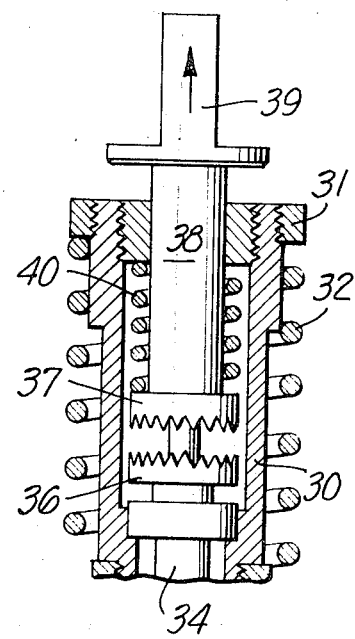
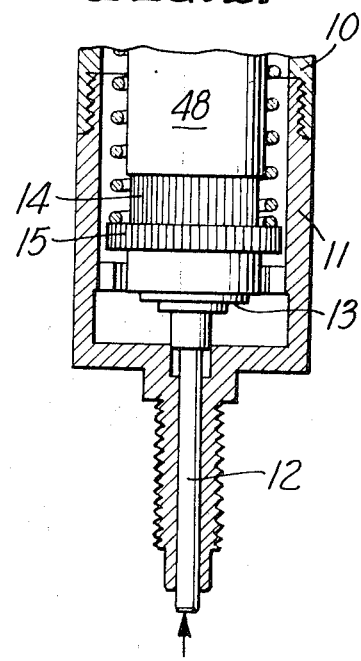

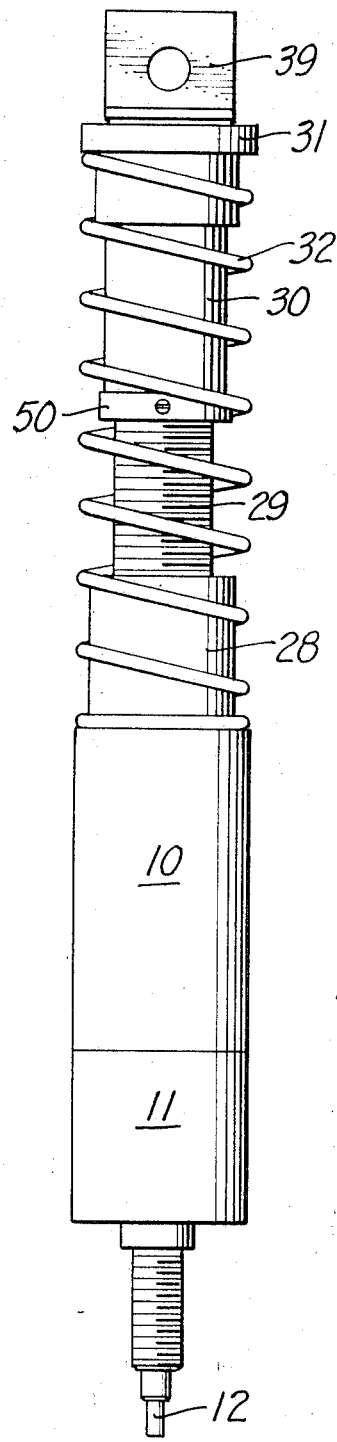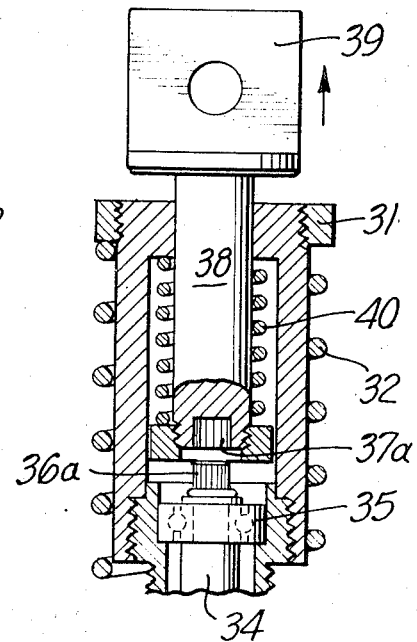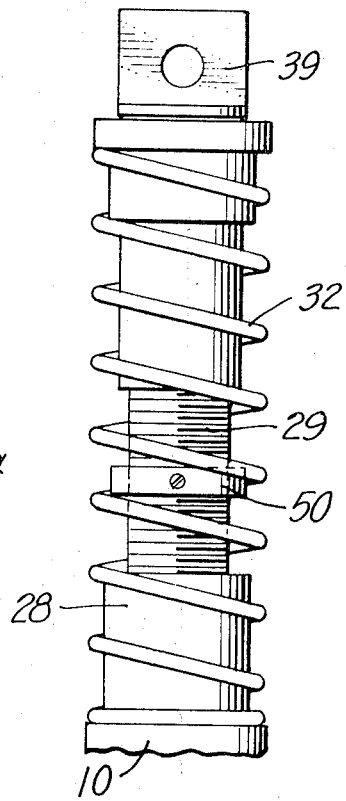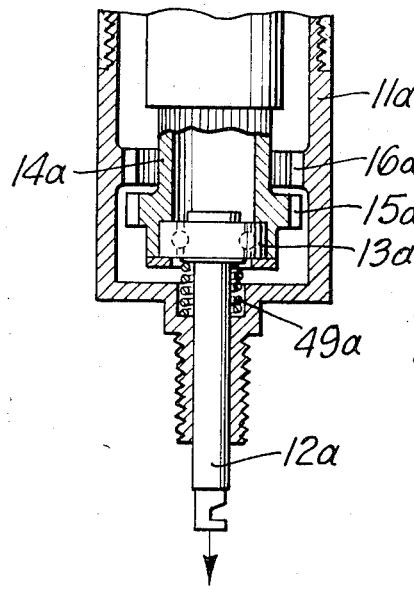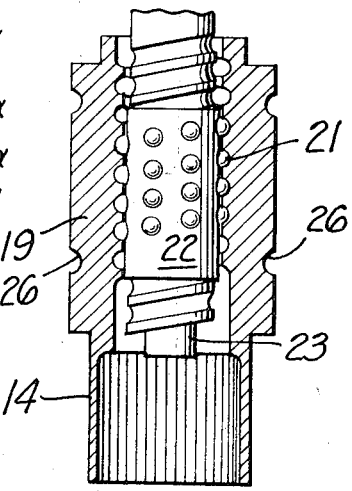

MECHANICAL LOCK CYLINDER

REFERENCE TO RELATED PATENT

This invention is an improvement upon the structure shown in my U.S. Pat. No. 3,436,973 issued Apr. 8, 1969.

BACKGROUND OF THE INVENTION

1. Field of the Invention

The invention relates to a mechanical lock cylinder which provides linear adjustment by purely mechanical means and which is self-locking at any and all points within its stroke limits. The present invention provides such a device having locking means at each end of the cylinder.

2. Description of the Prior Art

The closest prior art known to the applicant is his above-mentioned prior patent.

SUMMARY OF THE INVENTION

The invention relates to a mechanical lock cylinder which provides linear adjustment along the entire length of its stroke by purely mechanical means. It also is self-locking at any and all points along its stroke.

It is an object of the present invention to provide a device of the class described which is an improvement over the prior art in that the cylinder is capable of being locked and released from either end of the cylinder. In use, this means that a passenger in a vehicle may operate one control to selectively recline or raise the seat. If the seat is left in a reclining position, a hostess may release and operate the cylinder to return the seat to its normal position.

Another object of the invention is to provide a device of the type described having means for limiting the stroke of the cylinder to any degree from the maximum possible movement to a completely locked position of zero movement. This means that a seat can be adjusted to permit only partial reclining movement or it can be locked to prevent any reclining movement whatsoever.

It is a further object of the invention to provide such a device having an improved cage-type of ball nut which operates in a manner comparable to that of a planetary gear assembly.

Another object of the invention is to provide alternative mechanical structures for the hostess operated release and to provide alternative mechanical structures for the passenger-operated release and particularly to provide for optional push- or pull-type of operation.

It is accordingly among the objects of the present invention to provide a mechanical lock cylinder having all of the advantages and benefits set forth above and following from the structure described hereinafter in this application.

My invention also comprises such other objects, advantages and capabilities as will later more fully appear and which are inherently possessed by my invention.

While I have shown herein preferred embodiments of my invention, it should be understood that the same are susceptible of modification and change without departing from the spirit of my invention.

DESCRIPTION OF THE DRAWINGS

FIG. 1 is a side-elevational view of my mechanical lock cylinder with the screw in its fully withdrawn position;

FIG. 2 is a longitudinal sectional view of the same, somewhat enlarged;

FIG. 3 is a fragmentary longitudinal sectional view of the ratchet assembly in open or released position;

FIG. 4 is a fragmentary longitudinal sectional view of the spline assembly in open position;

FIG. 5 is a view similar to FIG. 1, showing the device with the screw in fully extended position;

FIG. 6 is a view similar to FIG. 3 showing an alternative embodiment of the invention utilizing splines in place of ratchets;

FIG. 7 is a view similar to FIG. 4 showing an alternative embodiment of the invention in which the splines are moved outwardly to released position;

FIG. 8 is a partial side-elevational view of the cylinder in fully extended position with the stop collar in a medial position.

FIG. 9 is a partial sectional view of the ball nut and screw assembly of FIG. 2, with the screw, cage and balls shown in elevation.

DESCRIPTION OF THE PREFERRED EMBODIMENT

A first preferred embodiment which has been selected to illustrate the invention is shown in FIGS. 1-5 of the drawings. It comprises an elongated tubular outer housing 10, one end of which is closed off by an end member 11. Extending outwardly through an opening in the end member 11 is an enlarged push rod 12. The inner end of the rod 12 engages a bearing 13 which is disposed within the end member 11.

The bearing 13 is secured within the outer end of a cylindrical sleeve 14, which is mounted for sliding reciprocal movement within the end member 11. Extending radially outwardly from the periphery of the sleeve 14 are a plurality of splines 15, which are preferably disposed around the entire circumference of the sleeve 14. The splines 15 on the sleeve 14 are adapted to slidably and reciprocally engage a plurality of complementary formed fixed splines 16 which extend radially inwardly from the interior wall of the end member 11.

The inner end of the sleeve 14 carries a plurality of alternating lands and grooves which extend around its periphery and which slidably and reciprocally engage complementary formed alternating lands and grooves disposed on the lower end of an extension 48 of an elongated nut 19. The interior wall of the nut 19 is provided with spiral grooves which are dimensioned to rotatably receive a plurality of balls 21 which are rotatably held by a tubular cage 22. An elongated screw 23 has its outer surface provided with spiral grooves 24 which also rotatably receive the balls 21.

A coil spring 49 surrounds the extension 48 of the nut 19 and the inner portion of the sleeve 14. One end of the spring 49 engages the nut 19 adjacent to the inner end of the extension 48, while the other end engages the splines 15 on the sleeve 14. The coil spring 49 normally urges the sleeve 14 outwardly so that the splines 15 engage the splines 16.

When the screw 23 is rotated, it moves linearly within the nut 19. The cage 22 also rotates and moves linearly, but at a substantially slower rate than the screw 23. The operation of the assembly is similar to that of a planetary gear system in which the screw 23 is the sun gear, the balls 21 are the planetary gears, cage 22 is the cage and the ball nut 19 is the ring gear.

If the cage 22 is prevented from linear movement, the entire ball nut and screw assembly becomes locked. Stops may accordingly be provided on opposite ends of the nut 19 to define the range of travel or movement of the screw 23.

Instead of this ball nut structure, it is also possible to use a ball nut structure of the type shown and described in my prior U.S. Pat. No. 3,436,973 or any other comparable or suitable type of structure.

The outer surface of the nut 19 is provided with a pair of annular grooves 26 in which are mounted a plurality of balls 27. The opposite sides of the balls 27 are held within annular grooves formed on the interior wall of the outer housing 10.

The inner end of the housing 10 remote from the rod 12 is connected to a housing extension 28. An inner housing 30 has an externally screw-threaded portion 29 which is mounted for linear movement within the housing extension 28. The end of the inner housing 30 remote from the screw-threaded end 29 carries an outwardly directed flange 31. An elongated coil spring 32 surrounds the inner housing 30 and housing extension 28 and extends between the flange 31 and a flange 33 formed on the end of the housing extension 28 adjacent to its attachment to the outer housing 10.

The coil spring 32 exerts pressure upon the inner housing 30, urging it away from the outer housing 10. Such movement is permitted, however, only upon release of the nut 19 or screw 23.

Connected to the screw 23 is a shaft 34. The shaft 34 remote from its connection to the screw 23 is journaled in a bearing 35 mounted within the inner housing 30. Beyond the bearing 35, the shaft 34 is connected to a horizontally directed circular ratchet 36 having teeth which are adapted to engage the teeth of a second circular ratchet 37.

The ratchet 37 is carried by the end of a shaft 38 which slidably extends through an opening in the end of the inner housing 30. The end of the shaft 34 slidably extends into an axial opening 18 in the shaft 38. The end of the shaft 38 remote from the ratchet 37 is provided with a yoke 39 or other suitable means for attachment to a portion of a seat or the like. The yoke 39 and shaft 38 may be moved outwardly to release the ratchet 37 from engagement with the ratchet 36 and free the shaft 34 and screw 23 for rotation and linear movement to return the seat to its normal upright position.

A coil spring 40 extends between the ratchet 37 and the closed outer end of the housing 30. The coil spring 40 normally urges the ratchet 37 inwardly into engagement with the ratchet 36.

A stop collar 50 is threadably mounted on the screw-threaded portion 29 of the inner housing 30. The collar 50 may be moved by manual rotation to any desired position along the portion 29 in order to limit the linear movement of the screw 23 and shaft 34 by limiting the linear movement of the inner housing 30 with respect to the housing extension 28. When the collar 50 is disposed at its extreme outward position adjacent to the outer end of the extension 29, and screw 23 and shaft 34 are permitted the maximum amount of possible movement. When the collar 50 is disposed at its extreme inward position adjacent to the inner end of the extension 29, the collar so engages the end of the housing extension 28 to prevent any movement whatsoever. The collar 50 may thus be used to limit linear movement or to completely prevent such movement.

FIG. 6 shows another alternative embodiment of the invention in which the ratchets 36 and 37 are eliminated and are replaced by a splined projection 36a which slidably engages a complementary formed splined socket 37a to serve the same purpose and in functioning in substantially the same manner as the ratchets 36 and 37. It should also be understood that other suitable alternative locking means known to those skilled in the art may also be used.

FIG. 7 of the drawings shows an alternative embodiment of the invention in which the rod 12a is adapted for outward rather than inward movement to release the screw. The splines 16a are accordingly disposed somewhat further inwardly within the end member 11a. The splines 15a are moved outwardly to released position when the rod 12a is moved outwardly. A coil spring 49a extends between the bearing 13a and a seat formed in the end member 11a. The coil spring 49a normally urges the bearing 13a, sleeve 14a and splines 15a inwardly. When the rod 12a is moved outwardly, these members are moved outwardly against the urging of the coil spring 49a. When the outward pressure on the rod 12a is released, the coil spring 49a returns these members to their normal position and the screw is again locked.

In use, when the seat is disposed in an upright position, the inner housing 30 is disposed its maximum distance away from the housing 10 and the coil spring 32 is expanded. The ball nut assembly is locked against operation through the two locking means disposed at opposite ends of the cylinder.

The nut 19 is locked against rotation because its extension 48 is engaged with the sleeve 14 through the interengaging lands and grooves 17 and 18. The sleeve 14 is in turn locked against rotation by the interengagement between the splines 15 and 16. The nut 19 is accordingly locked against rotation with respect to the housing 10.

At the opposite end of the cylinder, the shaft 34 which comprises an extension of the screw 23 is locked against rotation by the interengagement between the teeth of the ratchets 37 and 37. The screw 23 is accordingly locked against rotation with respect to the housing 10.

When the passenger presses the rod 12 inwardly, the bearing 13, sleeve 14 and splines 15 are all moved inwardly simultaneously. When the splines 15 are moved a sufficient distance inwardly so that they no longer engage the splines 16, the nut 19 is no longer locked and is released for rotation. The seat may then be moved to any desired inclined position. This is accomplished through backward pressure against the seat, which compresses the cylinder against the pressure of the coil spring 32 and causes rotation of the nut 19 and inward linear movement of the shaft 34 and screw 23. It will be noted that only the nut 19 rotates and this rotation causes linear movement of the screw 23, which does not rotate.

The pressure against the seat may be discontinued at any inclined position of the seat and the seat will retain such position if the pressure on the rod 12 is released by the passenger. Upon such release, the coil spring 49 acts automatically to move the sleeve 14 outwardly to return the splines 15 into engagement with the splines 16 and lock the nut 19 against rotation.

If the seat is left in an inclined position by the passenger and the hostess wishes to return the seat to an upright position, she releases the other locking means through outward movement of the yoke 39. This releases the ratchet 37 from engagement with the ratchet 36 and frees the screw 23 for rotation and simultaneous linear movement. The coil spring 32 then acts automatically to expand the cylinder by exerting pressure urging the inner housing 30 outwardly away from the housing 10. Such movement causes rotation and linear movement of the screw 23. During this movement, the nut 19 remains stationary and does not rotate.

When the pressure on the yoke 39 is released, the coil spring 40 automatically returns the ratchet 37 into engagement with the ratchet 36 and relocks the shaft 34 and screw 23 against rotation.

It may accordingly be seen that the device is capable of two-way control and operation and that the seat may be moved to and locked in any position which may be desired and that it may be released from such position for automatic return to its normal position.

I claim:

1. A mechanical lock cylinder comprising a housing, a nut rotatably mounted within said housing a screw rotatably mounted within said nut, said screw being movable longitudinally within said housing upon the rotation of said screw and also upon the rotation of said nut, first locking means disposed at one end of said housing engageable with said nut to selectively prevent or permit the rotation of said nut to control the longitudinal movement of said screw and second locking means at the opposite end of said housing engageable with said screw to selectively prevent or permit the rotation of said screw to control the longitudinal movement of said screw, said housing having two portions which are longitudinally expandable with respect to each other, said screw being longitudinally movable simultaneously with the expansion and contraction of said portions of said housing, and resilient means normally urging said housing toward expanded position, said nut and screw comprising a ball nut and screw, in which a plurality of ball bearings are mounted in the threads of said screw and the inner periphery of said nut, said second locking means comprising interengaging means releasably connecting said screw to the other portion of said housing, resilient means normally urging said interengaging means into engagement with each other, and longitudinally movable means operable to disengage said interengaging means against the urging of said coil spring.

2. The structure described in claim 1, said second locking means comprising a first locking member carried by a shaft connected at one end thereof to said screw, a second locking member carried by a second shaft disposed adjacent to the opposite end of said first-named shaft, resilient means normally urging said second shaft towards said first-named shaft to hold said locking members in engagement with each other, and a yoke attached to the end of said second shaft remote from its locking member, said yoke being adapted to disengage said locking members by longitudinal movement of said second shaft, to free said first-named shaft and said screw for rotation and to free said housing for expansion by said resilient means which normally urges said housing toward expanded position.

3. The structure described in claim 2, and the ends of said first and second shafts being in interengagement with each other to maintain said shafts in alignment during the longitudinal movement of said second shaft with respect to said first-named shaft.

4. The structure described in claim 1, said first locking means comprising interengaging means releasably connecting said nut to one portion of said housing, resilient means normally urging said interengaging means into engagement with each other, and longitudinally movable means operable to disengage said interengaging means against the urging of said coil spring.

5. The structure described in claim 4, and a stop collar rotatably mounted on one portion of said housing, said stop collar being longitudinally movable through manual rotation to control the length of expansion of said housing.

6. The structure described in claim 4, said ball nut and screw including a tubular cage in which said balls are mounted, said cage being mounted for rotatable and linear movement within said housing.

7. The structure described in claim 4, said first locking means comprising longitudinally directed and longitudinally movable interengaging splines connected respectively to said housing and said nut.

* * * * *